US011720985B2

(12) United States Patent
Smith et al.

(10) Patent No.: US 11,720,985 B2
(45) Date of Patent: Aug. 8, 2023

(54) VIRTUAL BOTTLE-SERVICE SYSTEM FOR ALLOCATING DRINKS FROM A REFILLABLE VAT OF LIQUOR

(71) Applicant: UNE LLC, Delray Beach, FL (US)

(72) Inventors: Jeffry R. Smith, Delray Beach, FL (US); John M. O'Neill, Delray Beach, FL (US)

(73) Assignee: UNE LLC, Delray Beach, FL (US)

( * ) Notice: Subject to any disclaimer, the term of this patent is extended or adjusted under 35 U.S.C. 154(b) by 0 days.

(21) Appl. No.: 17/930,032

(22) Filed: Sep. 6, 2022

(65) Prior Publication Data

US 2023/0008556 A1    Jan. 12, 2023

Related U.S. Application Data

(62) Division of application No. 17/454,658, filed on Nov. 12, 2021.

(Continued)

(51) Int. Cl.
    *G06Q 30/00*     (2023.01)
    *G06Q 50/12*     (2012.01)
    (Continued)

(52) U.S. Cl.
    CPC ......... *G06Q 50/12* (2013.01); *G06Q 30/0222* (2013.01); *G06Q 30/0635* (2013.01)

(58) Field of Classification Search
    CPC ......... G06Q 30/02–0277; G06Q 50/12; G06Q 30/0635
    See application file for complete search history.

(56) References Cited

U.S. PATENT DOCUMENTS 8,751,319 B2    6/2014  Silverstein
10,909,563 B1   2/2021  Aaron
(Continued)

FOREIGN PATENT DOCUMENTS

AU    2019101592 A4    1/2020
EP       2999659 B1    7/2019
WO  WO 2020/122818 A1  6/2020

OTHER PUBLICATIONS

Dialog article titled "Introducing IBar—The World's First Virtual Bar—All Drinks on the Cloud" M2 Presswire—Feb. 13, 2018, pp. 1-2 (Year: 2018).*

(Continued)

*Primary Examiner* — Raquel Alvarez
(74) *Attorney, Agent, or Firm* — Nixon Peabody LLP

(57) ABSTRACT

The present disclosure includes a method of providing a virtual bottle service from an establishment to a user. The virtual bottle service is accessible by the user via an app on a smartphone of a user. The method comprises receiving, via the app on the smartphone of a user, a purchase request for a virtual bottle from an establishment, and after the receiving, allocating the user with a predetermined number of drinks of a particular liquor from the establishment. The method further includes, in response to a drink order from the virtual bottle by the user, decrementing the number of drinks from the virtual bottle that remain available to the user. The method may also include communicating, to the user, the remaining number of drinks via the app on the smartphone. A corresponding system that incorporates and/or uses such a method is also provided.

18 Claims, 8 Drawing Sheets

Related U.S. Application Data

(60) Provisional application No. 63/198,785, filed on Nov. 12, 2020.

(51) Int. Cl.
    *G06Q 30/0601*      (2023.01)
    *G06Q 30/0207*      (2023.01)

(56) References Cited

U.S. PATENT DOCUMENTS

| | | |
|---|---|---|
| 2002/0059174 A1 | 5/2002 | Shapiro |
| 2007/0233567 A1 | 10/2007 | Daly |
| 2009/0055269 A1 | 2/2009 | Baron |
| 2009/0254453 A1 | 10/2009 | Sanguinetti |
| 2012/0036018 A1 | 2/2012 | Feliciano |
| 2012/0278113 A1 | 11/2012 | Mowers |
| 2014/0081777 A1 | 3/2014 | Mastrodonato |
| 2017/0053301 A1 | 2/2017 | Khan |
| 2018/0174074 A1 | 6/2018 | Hudson |
| 2020/0126171 A1 | 4/2020 | Jabara |
| 2020/0210903 A1 | 7/2020 | Avila |

OTHER PUBLICATIONS

Dialog article titled "Bartab: S.F. Site Sends real drinks paid with digital cash to Facebook Friends" by Bay Rea News Group, Aug. 15, 2016, pp. 1-6 (Year: 2016).*

International Search Report and Written Opinion of International Searching Authority for Patent Application No. PCT/US21/59133, dated Mar. 15, 2022 (5 pages).

Tablelist, Inc.; "What is Table Service?"; Nov. 22, 2020; retrieved from https://www.tablelist.com/bottleservice101 (2 pages).

Ellwood, M.; "Meet the App That Makes Nighclubbing Not Terrible"; Dec. 15, 2015; retrieved from https://www.bloomberg.com/news/articles/2015-12-15/this-bottle-service-app-will-get-you-into-the-best-clubs (11 pages).

Jackson, C.; "InstaBottles brings online reservations to nightclub bottle service"; Sep. 28, 2015; retrieved from https://www.chicagotribune.com/business/blue-sky/ct-instabottles-online-bottle-service-bsi-20150928-story.html (6 pages).

Kurtaran, D.; "Vice-Tech Goes VIP: This App Lets You Book Bottle Service Across 12 Cities"; Jan. 24, 2017; retrieved from https://www.snapmunk.com/bottle-service-vice-tech-bottlestonight/ (3 pages).

Horn, J.; "BottlesTonight App Makes Bottle Service (a Little) Cheaper"; Jun. 9, 2014; retrieved from https://www.laweekly.com/bottlestonight-app-makes-bottle-service-a-little-cheaper/ (2 pages).

Azmi; I.; "goVIP app: VIP Bottle Service at Your Fingertips"; Jun. 2014; retrieved from https://www.indiegogo.com/projects/govip-app-vip-bottle-service-at-your-fingertips#/ (3 pages).

EZ Bottle Service; "EZ Bottle Service App"; 2014; retrieved from http://ezbottleservice.com/ (1 page).

Discotech; "Discotech website"; Nov. 22, 2020; retrieved from https://www.discotech.me/ (4 pages).

Finocchiaro, Peter, "Mobile Gifting App lets Friends Buy Each Other Drinks,"Mobil Commerce Daily, early 2017 (4 pages).

\* cited by examiner

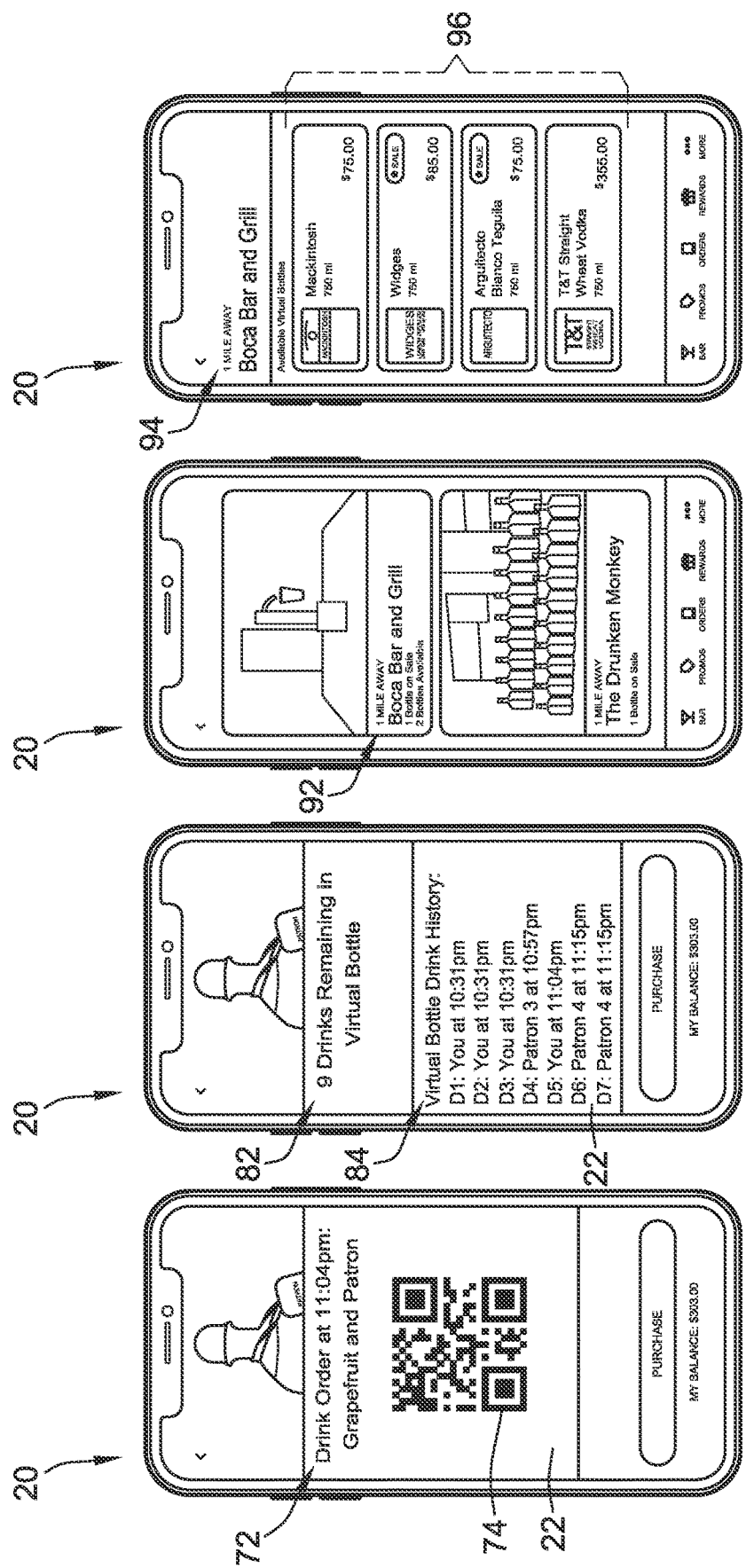

VIRTUAL BOTTLE-SERVICE SYSTEM FOR ALLOCATING DRINKS FROM A REFILLABLE VAT OF LIQUOR

CROSS-REFERENCE TO RELATED APPLICATIONS

This application is a divisional of U.S. application Ser. No. 17/454,658, filed Nov. 12, 2021 and published as U.S. 2022/0148106 A1, and to U.S. Provisional Application No. 63/198,785, filed Nov. 12, 2020, each of which is hereby incorporated herein by reference in its entirety.

TECHNICAL FIELD

The present disclosure relates to a system and method for allocating liquid product from a restaurant or bar that effectively provides the user with a virtual bottle service without the need for a physical bottle.

BACKGROUND

Bottle service is the sale of an entire bottle of liquor to a patron in a bar or nightclub. Often, purchasing bottle service includes reserved seating at a preferred location in the establishment. The bottle service may even include a dedicated waiter or waitress for the purpose of mixing and pouring drinks using the liquor from the bottle. Alternatively, the patron's time in the entrance line to the establishment or the cover charge for the establishment is eliminated upon agreement by the patron to purchase bottle service. Because of the special treatment of the patron who has purchased bottle service, there is a mark-up for the purchase of the bottle. The mark-up can be substantial, providing the establishment with a significant profit for simply allowing the patron to purchase and drink the bottle with his or her friends.

Some of the problems with bottle service relate the physical bottle itself. The bottle is much more likely to get passed around and be spilled when provided to a group of patrons. The bottle is made of glass, which creates a hazard if it is dropped and broken. More importantly, though the bottle is glass that can be recycled, they often are not recycled and typically end up in landfills.

Other problems with bottle service relate to the service aspect. While many patrons may desire the attention of the bottle service, others would prefer to blend-in more with their surroundings and not be noticed for having bottle service. Physical space is often limited in establishments, resulting in a limit to the number of patrons who can receive bottle service if a reserved space or table accompanies the bottle service. And when establishments become crowded, it may be difficult for the patron and his or her friends to travel to the reserved location at which the bottle can be accessed.

A need exists for an alternative way to permit patrons to purchase bottle service that avoids the problems with current bottle service.

SUMMARY

In one implementation, the present invention includes a method of providing a virtual bottle service from an establishment by use of an app on a smartphone of a user. The method comprises purchasing, via the app on the smartphone, a virtual bottle of a particular liquor from an establishment, and in response to the purchasing, receiving a predetermined number of e-vouchers corresponding to a predetermined number of drinks of the particular liquor. The e-vouchers are accessible by the user via the app. The method further includes displaying, on a display of the smartphone of the user, the number of drinks from the e-vouchers from the establishment that are available to the user, and, in response to a drink order from the virtual bottle by the user, decrementing the number of e-vouchers and displaying the remaining number of e-vouchers on the display of the smartphone. The method also includes, in response to the user transferring one of the e-vouchers to a patron of the establishment to provide that patron with the opportunity to order a drink from the virtual bottle, decrementing the number of e-vouchers and displaying the remaining number of e-vouchers on the display of the smartphone. The present invention also contemplates a system that incorporates and/or uses such a method.

In another aspect, the present invention also includes a method of providing a virtual bottle service from an establishment to a user. The virtual bottle service is accessible by the user via an app on a smartphone of a user. The method comprises receiving, via the app on the smartphone of a user, a purchase request for a virtual bottle from an establishment, and after the receiving, allocating the user with a predetermined number of drinks of a particular liquor from the establishment. The method further includes, in response to a drink order from the virtual bottle by the user, decrementing the number of drinks from the virtual bottle that remain available to the user. The method may also include communicating, to the user, the remaining number of drinks via the app on the smartphone. The present invention also contemplates a system that incorporates and/or uses such a method.

In a further aspect, the present invention also contemplates a method of providing a virtual bottle service from an establishment by use of an app on a smartphone of a user. The method comprises purchasing, via the app on the smartphone, a virtual bottle of a particular liquor from an establishment. The method also includes, in response to the purchasing, receiving a predetermined number of e-vouchers corresponding to a predetermined number of drinks of the particular liquor, the e-vouchers being accessible by the user via the app. The method also includes, in exchange for one of the e-vouchers associated with the app, receiving a drink from the establishment. The present invention also contemplates a system that incorporates and/or uses such a method.

In another implementation, the present invention is also a system for providing a virtual bottle of a particular liquor within an establishment by use of an app on a smartphone. The system includes a tangible refillable vat for containing a volume of specific liquor exceeding 1 liter. The refillable vat including a tangible tap from which to pour the specific liquor as a consumable liquid. The system includes a host system that communicates with smartphones of patrons within the establishment. In response to a first patron purchasing a virtual bottle of the specific liquor via the app on the smartphone, the first patron is provided with e-vouchers corresponding to a predetermined number of drinks from the virtual bottle. And wherein, in response to the first patron ordering a consumable drink via the app, the first patron redeems one of the e-vouchers and the drink is provided to the user after being poured from the tap of the refillable vat.

In a still further implementation a computer-implemented method of receiving drink orders from a virtual bottle is disclosed. The method includes: storing on a first computing device a virtual bottle representing a predetermined volume of virtual liquid corresponding to a first volume of a consumable liquid stored in a tangible structure; providing an option on a software application executed on the first computing device to divide the virtual bottle into a corresponding plurality of e-vouchers, each of the plurality of e-vouchers corresponding to a consumable drink including a portion of the predetermined volume of virtual liquid; receiving from a first user interface of the software application a request to deduct a to-be-dispensed portion of the virtual liquid from a virtual bottle; receiving by a second computing device a first code provided by the first computing device, the first code representing a drink order that includes a portion of the first volume of the consumable liquid corresponding to the to-be-dispensed portion of the virtual liquid; validating the code, and, responsive thereto, deducting the to-be-dispensed portion from the virtual bottle and communicating the drink order by a point-of-sale (POS) system in an establishment to an electronic display that displays a representation of the drink order; responsive to the displaying, causing a drink including the portion of the first volume of the consumable liquid to be prepared in the establishment and poured into a tangible drinking vessel for delivery to a user of the first computing device in the establishment.

The method can further include: receiving from the first computing device a request to exercise the option to divide the virtual bottle into the corresponding plurality of e-vouchers, and, responsive thereto, storing on the first computing device a plurality of e-vouchers associated with the virtual bottle; communicating directly or indirectly at least one of the plurality of e-vouchers from the first computing device to a third computing device; receiving from a third user interface of a second software application executed on the third computing device a request to use the at least one of the plurality of e-vouchers; receiving by the second computing device or a fourth computing device a second code provided by the third computing device, the second code representing a second drink order redeemable by the at least one of the plurality of e-vouchers; validating the second code, and, responsive thereto, removing or disabling the at least one e-voucher from the third computing device, and communicating the second drink order to the electronic display that displays the second drink order; responsive to displaying the second drink order, causing a second drink fulfilling the second drink order to be prepared in the establishment and a corresponding portion of the first volume of the consumable liquid to be poured into a second tangible drinking vessel for delivery to a second user of the third computing device.

The method can further include deducting from a memory of the first computing device a portion from the virtual bottle corresponding to a volume of consumable liquid associated with the at least one e-voucher.

The present invention also includes a graphical user interface that is used in association with the app in accordance with the methods and systems described below in the specification and/or FIGS. 1-11.

The present invention further includes a graphical user interface that is used in association with the app to transfer benefits from the virtual bottle service to another patron in accordance with the methods and systems described below in the specification and/or FIGS. 1-11.

The present invention further involves a graphical user interface that is used in association with the app to redeem an e-voucher from the virtual bottle service for a drink in accordance with the methods and systems described below in the specification and/or FIGS. 1-11.

In another aspect, the present invention includes a graphical user interface that is used in association with the app to provide various bottle-service offers to patrons or potential patrons in accordance with the methods and systems described below in the specification and/or FIGS. 1-11.

In yet a further aspect, the present invention includes a graphical user interface that is used in association with the app to order a virtual bottle service in accordance with the methods and systems described below in the specification and/or FIGS. 1-11.

BRIEF DESCRIPTION OF THE DRAWINGS

The foregoing and other advantages of the present disclosure will become apparent upon reading the following detailed description and upon reference to the drawings.

FIG. 7 illustrates an alternative graphical user interface within the app on the smartphone in which a code is displayed that permits the patron to order the drink from the virtual bottle.

FIG. 8 illustrates another graphical user interface within the app on the smartphone in which the remaining number of drinks from the virtual bottle and the drink history are illustrated.

FIG. 9A illustrates a graphical user interface within the app on the smartphone in which the patron is provided notice of offers for bottle service from different establishments.

FIG. 9B illustrates another graphical user interface within the app on the smartphone in which the patron is provided with offers for various types of bottle service within a specific establishment.

Figure 1:
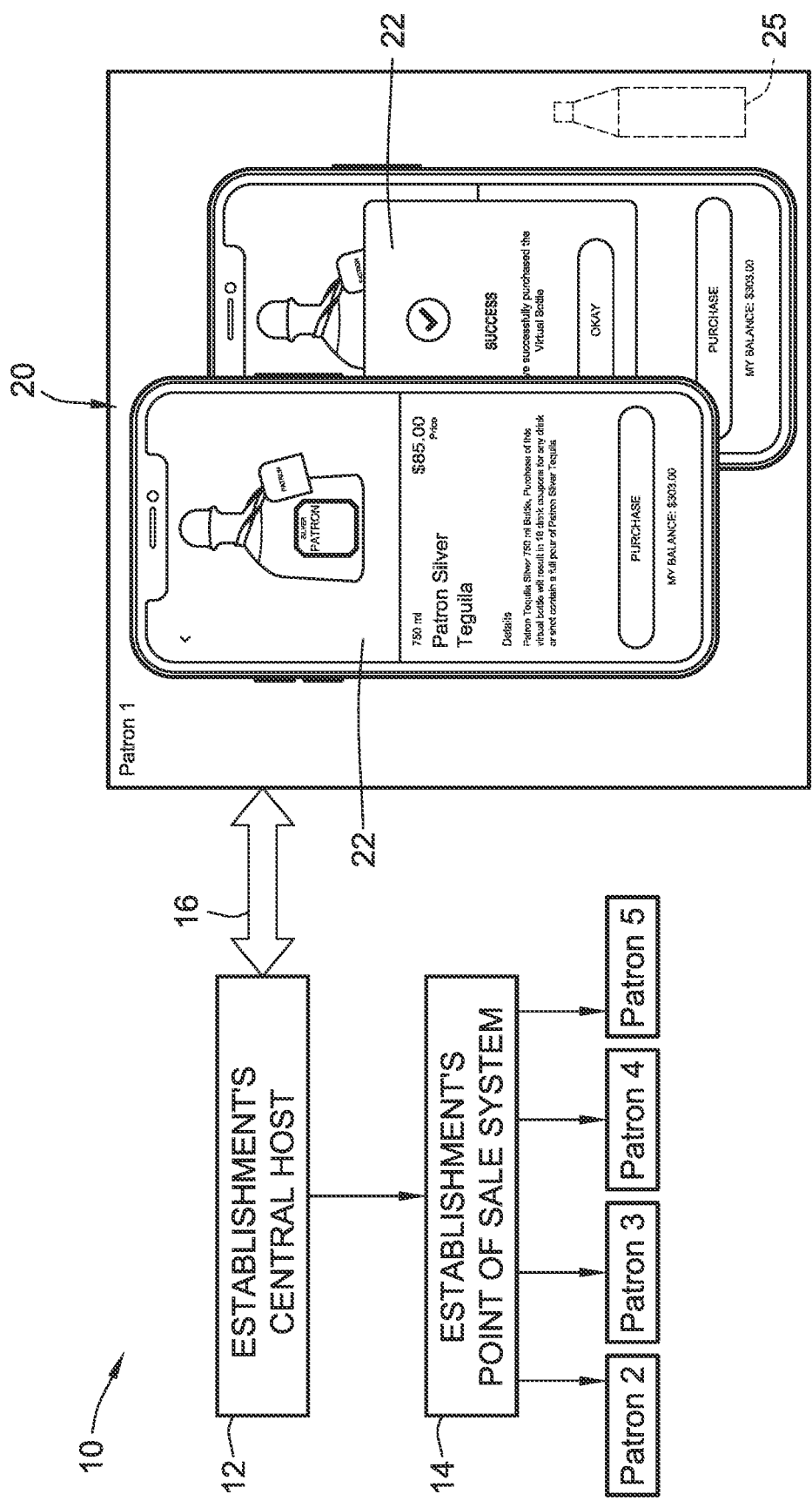
FIG. 1 illustrates a virtual-bottle system allowing a patron to purchase a virtual bottle of liquor from an establishment by use of an app on the patron's smartphone.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

The present disclosure is described with reference to the attached figures, where like reference numerals are used throughout the figures to designate similar or equivalent elements. The figures are not drawn to scale, and are provided merely to illustrate the instant disclosure. Several aspects of the disclosure are described below with reference to example applications for illustration.

FIG. 1 illustrates virtual-bottle system 10 that includes a central host 12 and a point-of-sale (POS) system 14 of an establishment. The central host 12 typically includes transceivers to communicate internally with the POS system 14 and externally to other systems and patrons via the internet. The central host 12 includes electronic storage (or has access remote storage) for storing information associated with the virtual-bottle service, as described below. The POS system 14 includes the locations within the establishment where patrons are making purchases, which includes fixed-payment registers and mobile-payment registers carried by a waiter or waitress within the establishment. The virtual-bottle system 10 of the establishment also forms a communication link 16 (e.g., Bluetooth, Wifi, etc.) to its patrons' smartphones, such as smartphone 20 of Patron 1, which includes an app 22 to facilitate the communications described in detail below. The communication link 16 between the patrons' smartphones and the establishment's central host 12 may be local and direct, or via the internet. The present invention contemplates communications from the patrons' smartphones and the establishment's central host 12 to commercially available POS systems, such as the Toast® POS system from Toast, Inc. of Boston, Mass. and the Revel® POS system from Revel Systems, Inc. of Atlanta, Ga. Application programming interfaces (APIs) may be used within the virtual-bottle system 10 to permit communication with the various types of POS systems.

As shown in FIG. 1, the Patron 1 has the option of purchasing a virtual bottle of Patrón Silver tequila via the app 22 for $85. After paying for the purchase of the virtual bottle, the app 22 informs Patron 1 that the purchase was a success, and Patron 1 is now the owner of a virtual bottle 25 of Patrón Silver tequila that can be redeemed at the establishment. The virtual bottle 25 is not a physical bottle of Patrón Silver tequila, but is instead the equivalent volume of a standard liquor bottle having a predetermined number of drinks (or pours) for that particular liquor. For example, as a typical 750 ml physical bottle of hard liquor provides approximately sixteen drinks, the purchase of the virtual bottle 25 provides Patron 1 with the ability to obtain sixteen drinks (standard pour is approximately 45-50 ml of consumable liquid from the physical bottle), although different size bottles may provide a different predetermined number of drinks. In one preferred embodiment, the predetermined number of drinks from the virtual bottle 25 are provided in the form of e-vouchers (i.e., an electronic drink ticket), which are saved in a storage or memory device of (or accessible by) the smartphone 20 of Patron 1 and also in a storage device of (or accessible by) within the establishment's central host 12 or POS system 14. As such, for a typical 750 ml physical bottle, Patron 1 has sixteen e-vouchers that he or she can use for drinks or transfer to other patrons, and the establishment monitors the use/transfer of the e-vouchers by Patron 1 and that information is stored locally at the central host 12 (or in a remote storage accessible by the central host 12). Patron 1 may use all of the e-vouchers in one day or evening at the establishment. But because it is a virtual bottle 25, the virtual-bottle system 10 allows for Patron 1 to redeem drinks of the virtual bottle 25 not just on the day of purchase, but on a subsequent visit to the establishment. This is advantageous to the establishment, as it entices patron 1 to return at a later date. It should be understood that the present invention further contemplates applying an expiration date to the virtual bottle 25, such that Patron 1 must redeem the entirety of the virtual bottle 25 (e.g., sixteen drinks) within a certain period of time (e.g., one week, or one month).

As used herein, a "virtual bottle" can be represented as a graphical element on a graphical user interface of the smartphone 20, and represents a predetermined volume (e.g., 750 ml) of "virtual liquid" (i.e., assumes the virtual bottle is "full"), which corresponds to a first volume (e.g., 750 ml) of a consumable liquid (e.g., an alcoholic spirit) in a tangible structure (e.g., a physical glass or plastic bottle or a physical vat or other container). By contrast, terms like bottle and vat as used herein connote tangible, physical structures in the real world that hold or contain a liquid that can be consumed by a human.

For the establishment to participate in the virtual-bottle system 10, the establishment creates an on-line account associated with the app 22. Once the account is created, the establishment adds the types of virtual bottles 25 that it wants to sell so they become viewable by patrons on their smartphones. For example, it may be a set number bottles that the establishment physically has available for bottle service. Consequently, the establishment's account for the app 22 may act like a digital store registry and menu of bottle service for that establishment.

Figure 2:
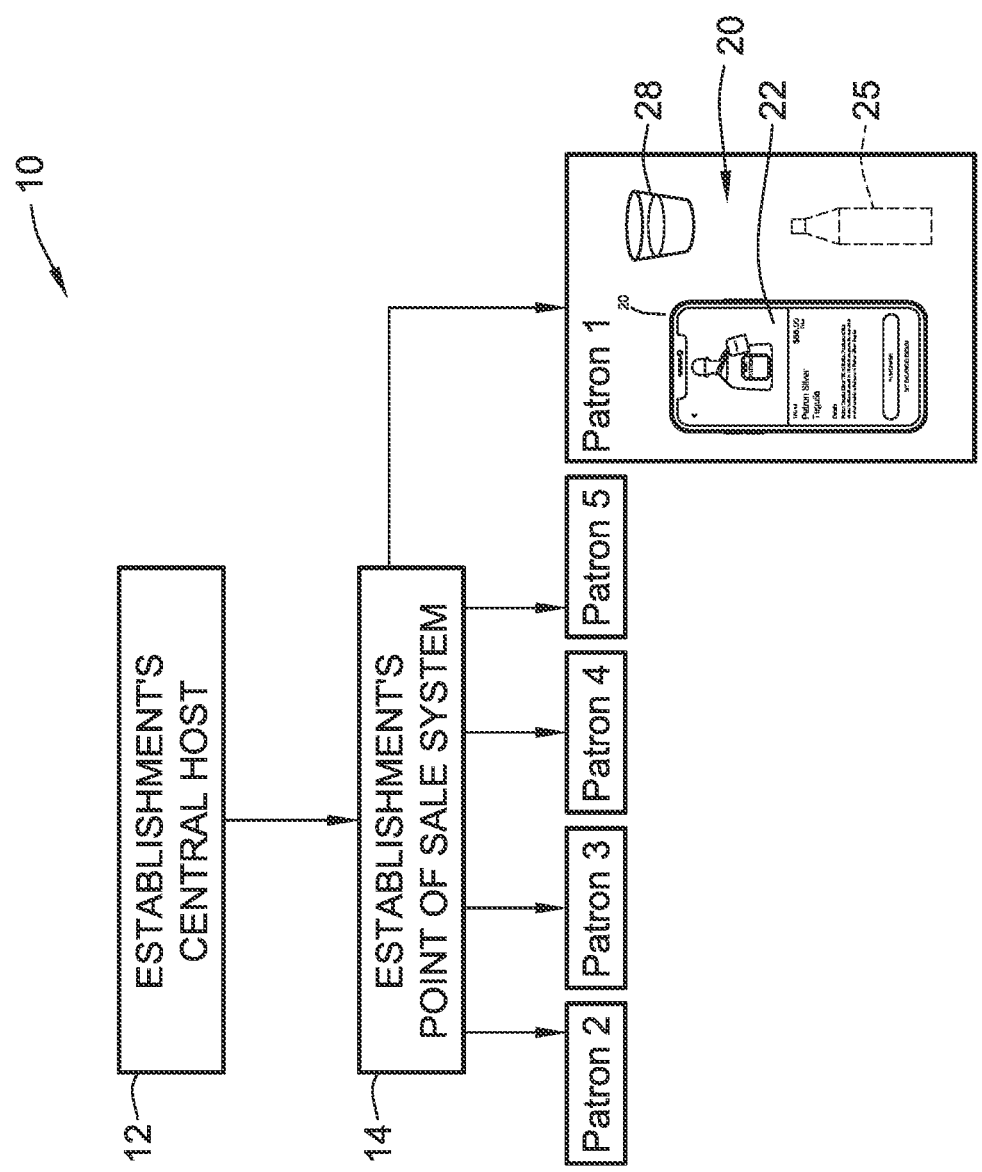
FIG. 2 is a schematic illustrating the patron using the virtual-bottle system to obtain a drink from the virtual bottle.

As illustrated in FIG. 2, after purchasing the virtual bottle 25, the Patron 1 can now use the app 22 on the smartphone 20 to obtain a virtual drink 28 from the virtual bottle 25, which, once the purchase has been consummated, will cause a corresponding tangible drink from a tangible bottle to be poured (and possibly mixed with other consumables) and delivered as a tangible drink in a tangible structure (e.g., a tangible glass) to Patron 1. The app 22 may provide for a menu of recommended mixers for the particular liquor within the virtual bottle 25 and display those mixer options to Patron 1. By providing the establishment's waitress or waiter with an e-voucher with a valid code at the POS system 14 (discussed in more detail below in FIGS. 6-7), Patron 1 is not required to transfer any cash. However, the app 22 may also permit Patron 1 to provide a gratuity to the waitress or waiter.

The virtual drink 28 corresponds to a to-be-dispensed portion (e.g., about 45 or 50 ml) from the virtual bottle 25, which when communicated to the POS system 14 of an establishment, alerts the bartender in the establishment, by displaying a representation of the drink order corresponding to the virtual drink 28, to make a tangible drink including pouring an amount corresponding to the to-be-dispensed portion (e.g., about 45 or 50 ml) of actual liquid from a tangible bottle or vat, as discussed in more detail herein. A human server (or possibly an automated robotic server) then delivers the consumable drink contained in the physical glass or other drinking vessel to Patron 1 in the establishment.

Figure 3:
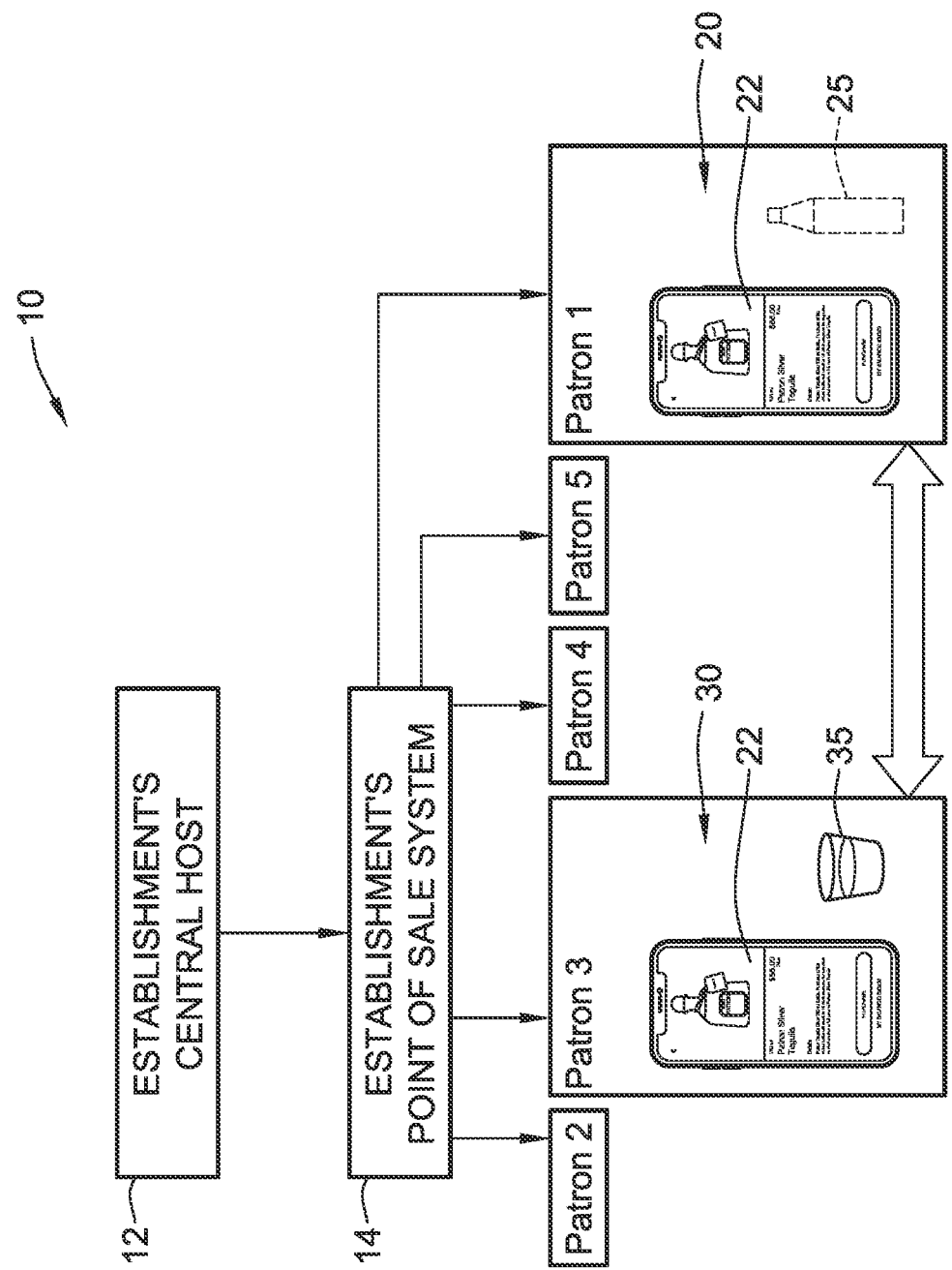
FIG. 3 is a schematic illustrating the patron transferring to another patron the right to use the virtual bottle for a single drink.
Figure 4:
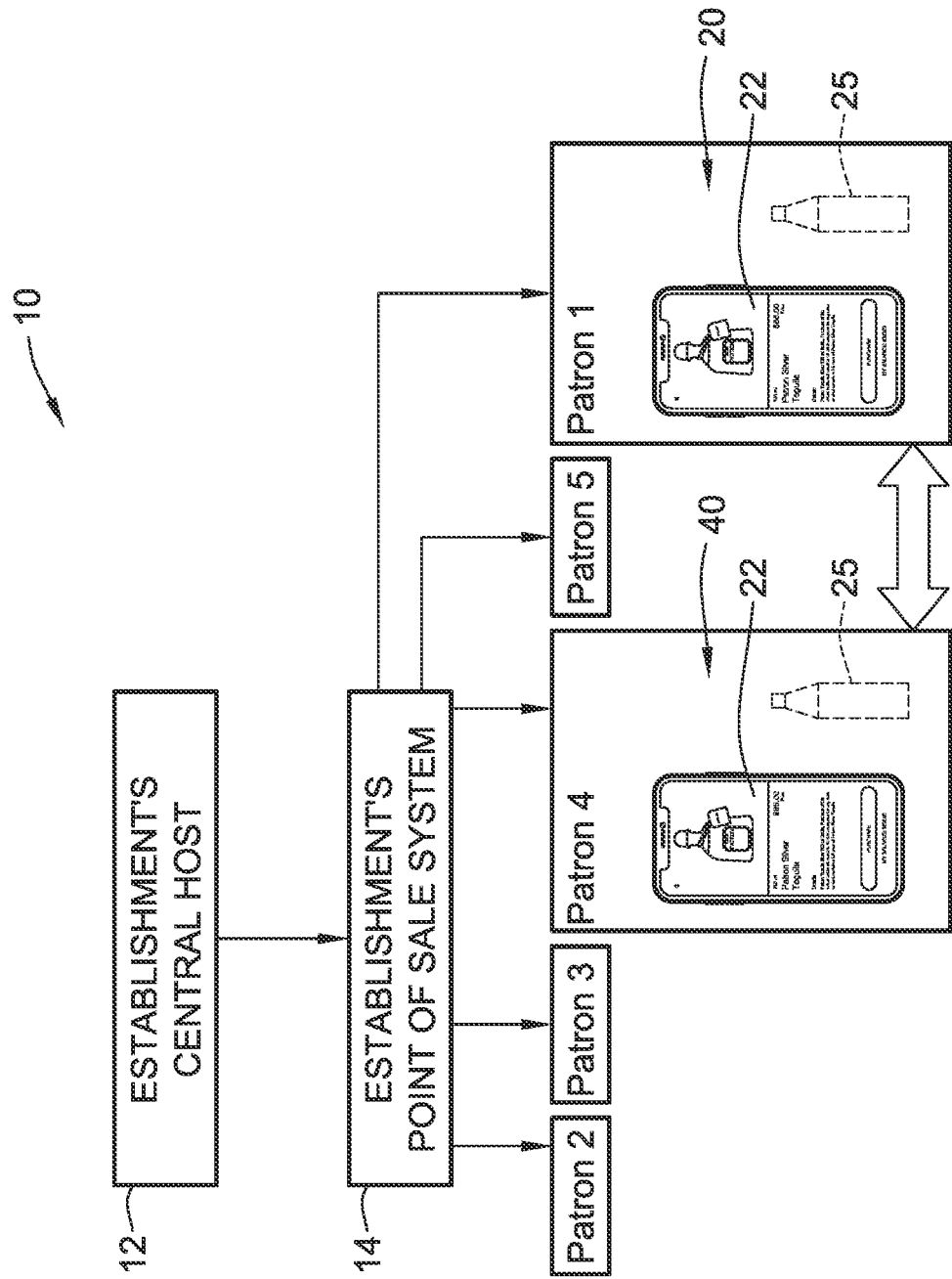
FIG. 4 is a schematic illustrating the patron transferring to yet another patron the right to use the virtual bottle.

FIGS. 3 and 4 illustrate how the virtual bottle 25 can be redeemed through the virtual-bottle system 10 by other patrons approved by Patron 1. In FIG. 3, Patron 1 has chosen to transfer to Patron 3 the benefit of the virtual bottle 25. In a preferred embodiment, Patron 3 also has a smartphone 30 with the app 22, although the present invention contemplates allowing Patron 1 to transfer a redeemable voucher to Patron 3 without the need for Patron 3 to have the app 22 on his or her smartphone 30. Through a communication link (e.g., Bluetooth, Wifi, text link, etc.) between the smartphone 20 of Patron 1 and the smartphone 30 of Patron 3, Patron 1 transfers a single e-voucher (or multiple e-vouchers) to Patron 3. Once the e-voucher is received, Patron 3 can use the e-voucher to obtain a drink 35 from the virtual bottle 25 that is owned by Patron 1. As such, the remaining number of e-vouchers for Patron 1 is decremented by one due to the transfer to Patron 3.

FIG. 4 illustrates an alternative type of transfer from Patron 1. Here, through a communication link (e.g., Bluetooth, Wifi, text link, etc.) between the smartphone 20 of Patron 1 and a smartphone 40 of Patron 4, Patron 1 has granted full approval for Patron 4 to use the virtual bottle 25 just as Patron 1 is free to use it. The smartphone 40 of Patron 4 includes the app 22 so as to allow Patron 4 to use the e-vouchers, just at Patron 1 does. In effect, Patron 1 and Patron 4 are "splitting" the virtual bottle 25. The present invention contemplates the app 22 provides the ability for Patrons 1 and 4 to split the cost of the virtual bottle 25 during the initial purchase (See FIG. 1) or after the initial purchase has been completed.

The present invention further contemplates that the app 22 also provides Patron 1 with a list of other patrons in the establishment so that Patron 1 can more easily locate patrons to whom to transfer the benefits of the virtual bottle. In such a system, each patron with the app 22 is able to control and limit the amount of available information about that patron that is accessible to Patron 1 (and other patrons) via the app 22. Further, in one embodiment, all or some of the patrons in an establishment are informed when another patron purchases a virtual bottle. Again, the app 22 allows the patron to determine whether the information about a bottle-service purchase is publicized and/or to whom (i.e., which other patrons) the notification is provided. In other embodiments, the app 22 may also permit the patron to purchase a virtual bottle 25 for a different patron who is within the same establishment, such that control over the virtual bottle 25 passes to the recipient, as opposed to the purchasing patron. The app 22 may further permit the patron to purchase a virtual bottle 25 for a person who is not present at the establishment, such that control over the virtual bottle 25 passes to the recipient who may use it at a later time at the establishment.

Figure 5:
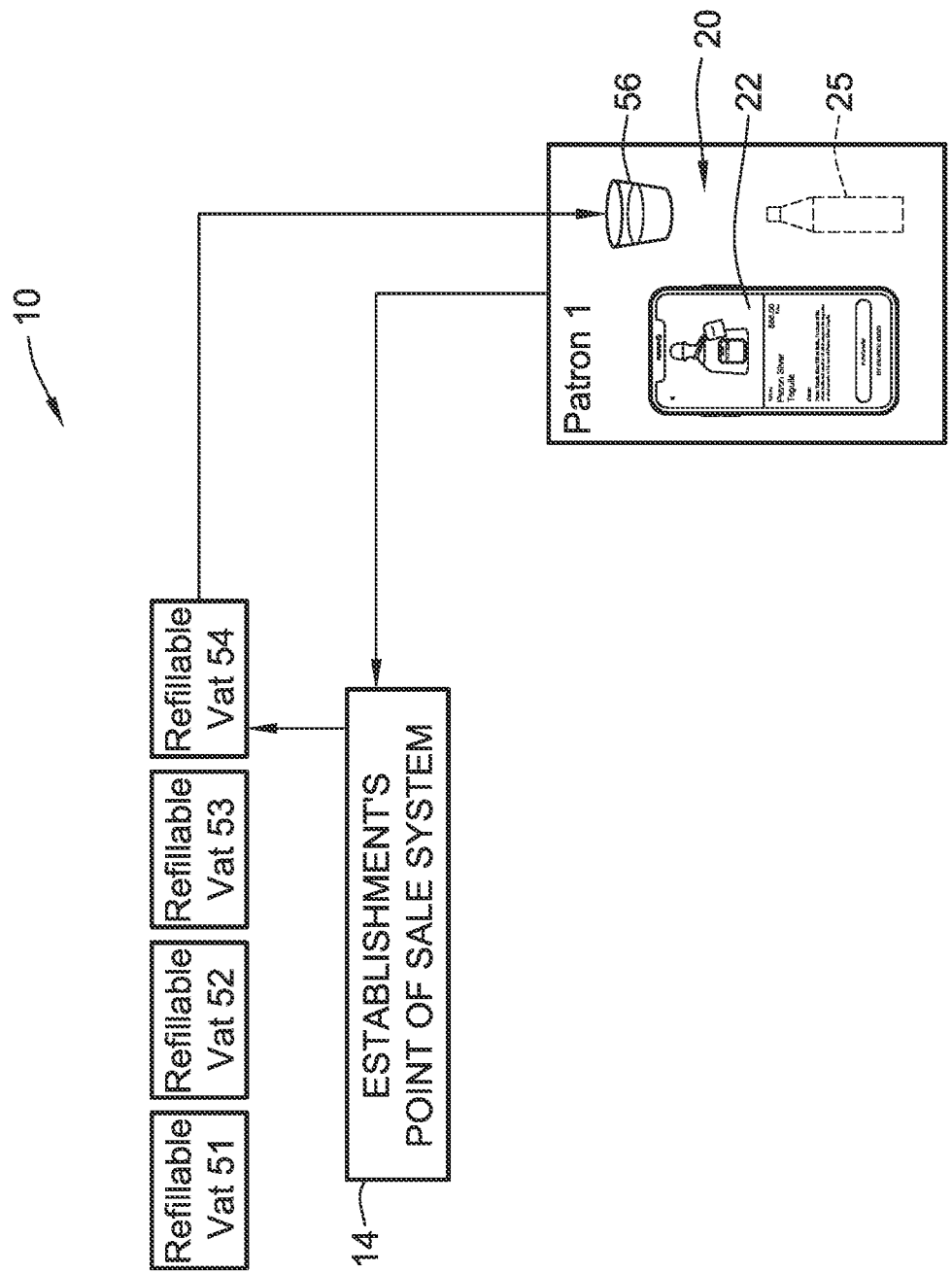
FIG. 5 is a schematic illustrating the patron using the virtual bottle service to obtain a drink from the virtual bottle in which the pour of the liquor is from a refillable vat.

FIG. 5 illustrates the virtual-bottle system 10 in use within an establishment that pours drinks from large vats of alcohol, as opposed to pouring drinks from physical bottles (e.g., which have a volume limit of 750 ml). The establishment may have a plurality of refillable (i.e., reusable) vats 51, 52, 53, 54. Each of the refillable vats 51, 52, 53, 54 is dedicated to a specific liquor, such that it only contains a certain type and brand of liquor. The refillable vats 51, 52, 53, 54 are generally much larger than a normal physical bottle, and exceed 1 liter (e.g., 10 liters). In the example of FIG. 5, the refillable vat 54 is dedicated to Patrón Silver tequila, which is the type of virtual bottle 25 that has been purchased by Patron 1 in FIG. 1. In exchange for one of the e-vouchers associated with the virtual bottle 25, the waiter or waitress creates a drink 56 for Patron 1 by pouring Patrón Silver tequila from the refillable vat 54.

Consequently, for establishments that choose to move away from physical bottles for environmental and/or cost reasons, the virtual-bottle system 10 is especially beneficial because it still allows patrons to purchase bottle service, albeit through the virtual bottle 25. Furthermore, even establishments that still desire to have some physical bottles visible to the patrons for aesthetics and for identifying available liquors to their patrons, the virtual-bottle system 10 is advantageous because it allows for pours of liquor from the plurality of refillable vats 51, 52, 53, 54, such that the use of the physical bottles of liquor is minimized.

Figure 6D:
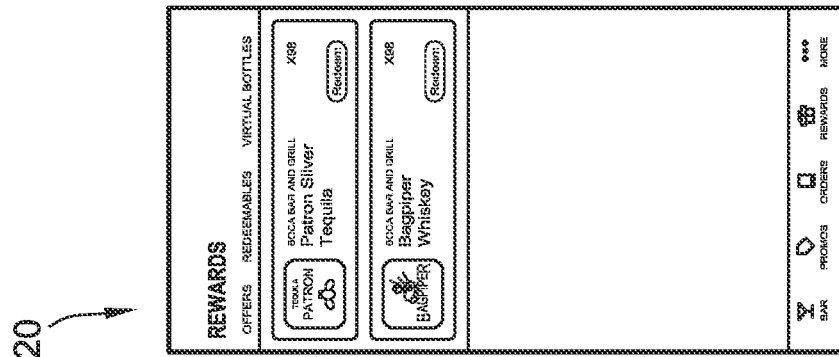
FIG. 6D illustrates a graphical user interface within the app on the smartphone after the drink order in FIG. 6C has been completed.
Figure 6C:
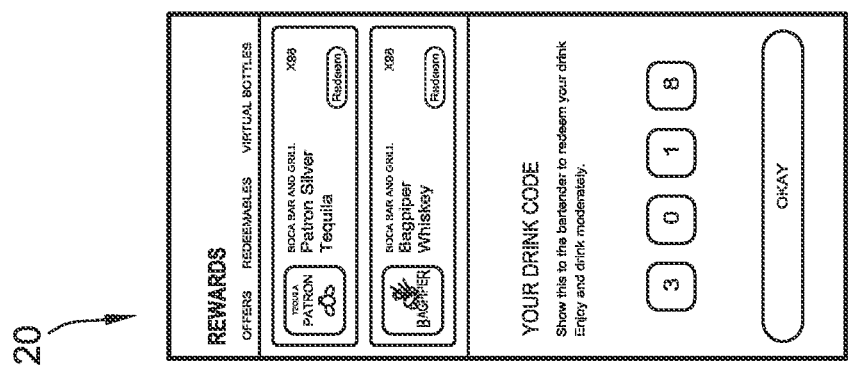
FIG. 6C illustrates a graphical user interface providing the user with a code to provide to the establishment's point of sale system to validate the transaction after the process of FIG. 6B.
Figure 6B:
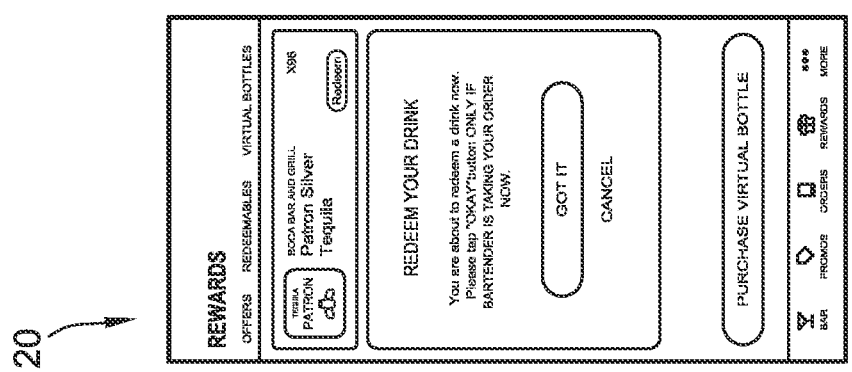
FIG. 6B illustrates a graphical user interface within the app on the smartphone in which the patron redeems a specific liquor for the drink after the process of FIG. 6A.
Figure 6A:
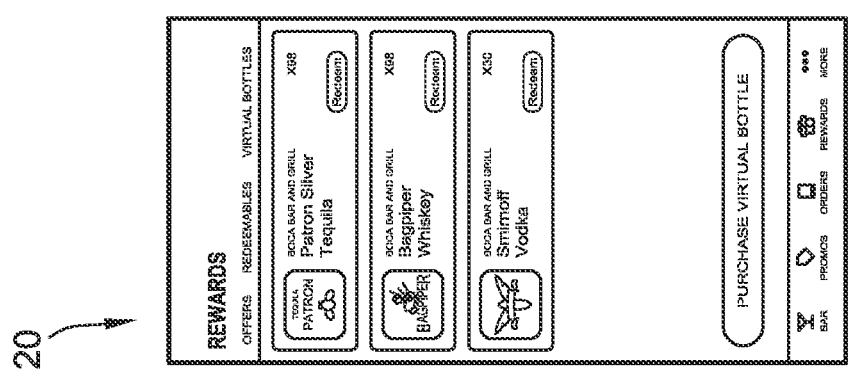
FIG. 6A illustrates a graphical user interface within the app on the smartphone in which the patron is choosing to redeem a drink from one of the virtual bottles available to the patron.

FIGS. 6A-6D illustrate an exemplary series of graphical user interfaces on the display of the smartphone 20 of Patron 1 during the redemption process according to one aspect of the present invention. As shown in FIG. 6A, Patron 1 has purchased three different virtual bottles, such that Patron 1 can select from three types of liquor (i.e., Patron 1 has access to three types of e-vouchers corresponding to the three types of liquor). It may also be that Patron 1 is the recipient of a transferred virtual bottle from another patron (as described in FIG. 4) or of only a transferred drink from a virtual bottle (as described in FIG. 3) as opposed to purchasing it. In FIG. 6B, Patron 1 has selected, via the graphical user interface within the app 22, the virtual bottle 25 associated with Patrón Silver tequila. After ordering the drink at the POS system 14 (e.g., the tequila plus some type of mixer), Patron 1 confirms redemption of the drink from the virtual bottle 25. The app 22 is also beneficial in that it preferable provides Patron 1 with a list of available drinks that can be made with the particular liquor from the virtual bottle 25.

In FIG. 6C, Patron 1 now receives a drink code (e.g., a numerical code or an alphanumeric code) for the e-voucher that Patron 1 then passes on to the waiter or waitress to obtain the drink. Because the drink code is stored in a memory at the establishment's central host 12 (or the POS system 14) and communicated to the smartphone 20 by use of the app 22, it is easily validated and authenticated by the POS system 14. The waiter or waitress may be required to enter the code into the POS system 14 or acknowledge its acceptance in the POS system 14 (e.g., activating a touch key in the POS system 14 displaying the "3018" drink code). After the transaction has been validated (e.g., the e-voucher for the virtual bottle 25 has its associated drink code entered into the POS system 14), the app 22 on the smartphone 20 transitions to a graphical interface in which remaining e-vouchers for virtual bottles are displayed to Patron 1, as shown in FIG. 6D. It should be understood that a specific drink code can be assigned to each e-voucher of the virtual bottle 25 when the purchase of the virtual bottle 25 takes place. In such a system, the e-vouchers stored in the smartphone 20 of Patron 1 after purchasing the virtual bottle 25 already include the code that is needed for redemption. Alternatively, upon an indication of a desire to redeem an e-voucher by Patron 1 (or to transfer an e-voucher to a different patron), the virtual-bottle system may generate a specific drink code that is assigned to the e-voucher.

FIG. 7 illustrates an alternative graphical user interface for the app 22 on the smartphone 20 of Patron 1 during the redemption process according to another aspect of the present invention. In this embodiment, in response to Patron 1 making a specific drink order 72, a scannable code 74 (e.g., bar code, QR code, etc.) appears from the app 22 on the display of the smartphone 20. The code 74 can then be scanned at the POS system 14 by the waiter or waitress. The specific drink order 72 for Patron 1 is also displayed, in addition to the time the drink order was placed.

FIG. 8 illustrates a graphical user interface for the app 22 on the smartphone 20 of Patron 1 for providing an accounting or inventory of the purchased e-vouchers for the virtual bottle 25. The graphical user interface provides the drink remainder count 82 (i.e., the remaining e-vouchers) along with an itemized history 84 of used e-vouchers. The itemized history 84 includes a statement of who used each e-voucher and when that e-voucher was used. As shown, the total number of e-vouchers are sixteen, of which nine e-vouchers for the virtual bottle 25 remain available and seven have been used by Patron 1, Patron 3 (FIG. 3), and Patron 4 (FIG. 4).

FIGS. 9A and 9B illustrate a graphical user interface for the app 22 on the smartphone 20 of Patron 1 that helps to guide Patron 1 for the best deals for bottle service in the area. By virtue of the GPS coordinates of the smartphone 20 of Patron 1, the app 22 feeds bottle-service options 92 from different establishments to Patron 1. As shown in FIG. 9B, the app 22 allows Patron 1 to choose the desired establishment 94 and then browse a menu of optional virtual bottles 96 and the associated prices. By allowing establishments to provide bottle-service "specials" directly to a variety of potential patrons in an area and to active patrons already within the establishment, the virtual-bottle system 10 permits the establishments to attract more patrons and to sell more virtual bottles. As such, the virtual-bottle system 10 also permits an establishment to offer specials for virtual bottles for the certain types of liquor that are currently in larger quantities in establishment's inventory.

Figure 10:
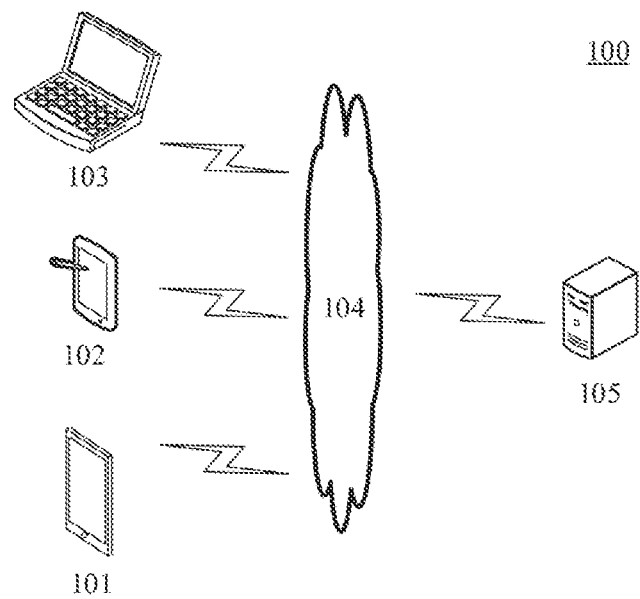
FIG. 10 shows an example system architecture for use with the methods and systems for allocation of a consumable liquid product from a virtual bottle.

FIG. 10 shows an example system architecture 10, 100 to which embodiments of a method and apparatus for allocation of a consumable liquid product from a virtual bottle, an electronic device and a computer-readable storage medium of the present disclosure can be applied. As shown in FIG. 10, the system architecture 100 may include terminal devices 101, 102, 103 (e.g., smartphones 20, 40 shown in FIG. 4), a network 104 and a server 105 (e.g., element 12, 14 shown in FIG. 1). The network 104 serves as a medium for providing a communication link between the terminal devices 101, 102, 103 and the server 105. The network 104 can include various types of connections, such as wired or wireless communication links, or optical fiber cables.

A user (e.g., user of smartphone 20, 40, or any of Patrons 2-5 shown in FIG. 1) can use the terminal devices 101, 102, 103 to interact with the server 105 through the network 104 to receive or send messages, and the like. Various software applications for implementing information communication between the terminal devices 101, 102, 103 and the server 105, such as virtual bottle ordering or point-of-sale (POS) applications, can be installed on the terminal devices 101, 102, 103 and the server 105.

The terminal devices 101, 102, 103 and the server 105 can be hardware or software or combination of both. When the terminal devices 101, 102, 103 are hardware, the terminal devices 101, 102, 103 can be various electronic devices having a display screen, including but not limited to, a smart phone, a tablet computer, a laptop portable computer and a desktop computer; and when the terminal devices 101, 102, 103 are software, the terminal devices 101, 102, 103 may be installed in the electronic devices, and can be implemented as multiple software pieces or software modules, or as a single software piece or software module, which is not specifically limited herein. When the server 105 is hardware, the server 105 can be implemented as a distributed server cluster composed of multiple servers, or as a single server; and when the server 105 is software, the server 105 may be implemented as multiple software pieces or software modules, or as a single software piece or software module, which is not specifically limited herein.

Figure 11:
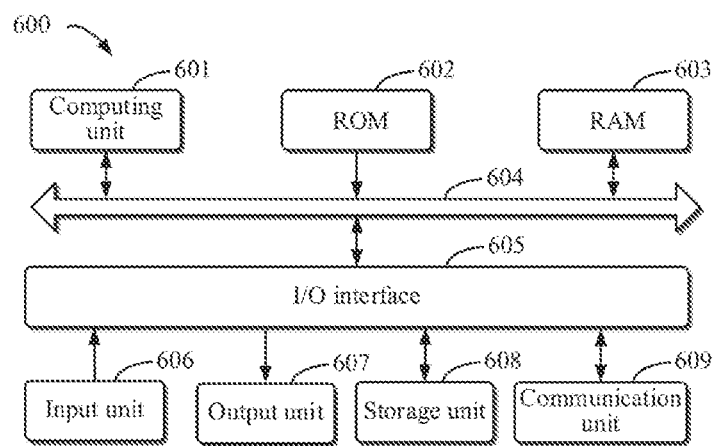
FIG. 11 illustrates a device with a computing unit for use with the methods and systems for allocation of a consumable liquid product from a virtual bottle.

As shown in FIG. 11, any device 600 disclosed herein (e.g., smartphones 20, 40, central host 12, POS 14) can include a computing unit 601, which can execute various appropriate actions and processes in accordance with a computer program stored in a read-only memory (ROM) 602 or a computer program loaded into a random-access memory (RAM) 603 from a storage unit 608. The RAM 603 may alternatively store various programs and data required by operations of the device 600. The computing unit 601, the ROM 602 and the RAM 603 are connected to each other through a bus 604. An input/output (I/O) interface 605 is also connected to the bus 604.

Multiple components of the device 600 are connected to the I/O interface 605, and include: an input unit 606, such as a keyboard and a mouse; an output unit 607, such as various types of displays and a speaker; a storage unit 608, such as a magnetic disk and an optical disk; and a communication unit 609, such as a network card, a modem and a wireless communication transceiver. The communication unit 609 allows the device 600 to exchange information or data with other devices through a computer network, such as the Internet, a local area network, and/or various telecommunications networks.

The computing unit 601 can be various general-purpose and/or specific-purpose processing components having processing and computing capabilities. Some examples of the computing unit 601 include, but are not limited to, a central processing unit (CPU), a graphics processing unit (GPU), various specific artificial intelligence (AI) computing chips, various computing units running machine learning model algorithms, a digital signal processor (DSP), and any appropriate processor, controller, microcontroller and the like. The computing unit 601 performs various methods and processing described above, such as the method for allocation of liquid product from a virtual bottle. For example, in some embodiments, the method for allocating liquid product from a virtual bottle can be implemented as a computer software program, which is tangibly included in a machine-readable medium, such as the storage unit 608. In some embodiments, part or all of the computer program may be loaded and/or installed on the device 600 through the ROM 602 and/or the communication unit 609. When the computer program is loaded into the RAM 603 and executed by the computing unit 601, one or more steps of the method for acquiring a traffic state described above may be performed. Alternatively, in other embodiments, the computing unit 601 may be configured to perform the method for allocating liquid product from a virtual bottle in any other appropriate manner (such as through firmware).

The various implementations of the systems and technologies described herein can be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations can include: being implemented in one or more computer programs, where the one or more computer programs can be executed and/or interpreted on a programmable system including at least one programmable processor, and the programmable processor can be a specific-purpose or general-purpose programmable processor, which can receive data and instructions from a storage system, at least one input device and at least one output device, and send the data and instructions to the storage system, the at least one input device and the at least one output device.

Program codes used to implement the methods of the present disclosure can be written in any combination of one or more programming languages. These program codes can be provided to a processor or controller of a general-purpose computer, specific-purpose computer or other programmable data processing apparatus, so that the program codes, when executed by the processor or controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium can be a tangible medium that may include or store a program for use by or in connection with an instruction execution system, apparatus or device. The machine-readable medium can be a machine-readable signal (non-transitory) medium or a machine-readable storage medium. The machine-readable medium can include, but is not limited to, an electronic, magnetic, optical, electromagnetic, infrared, or semiconductor system, apparatus or device, or any appropriate combination thereof. A more specific example of the machine-readable storage medium can include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein can be implemented on a computer having: a display device (such as a CRT (cathode ray tube) or LCD (liquid crystal display) monitor) for displaying information to the user; and a keyboard or touch-sensitive substrate and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein can be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as a cloud computing server or a cloud host, which is a host product in a cloud computing service system and may solve the defects of difficult management and weak service scalability existing in a conventional physical host and a VPS (Virtual Private Server) service. The server may alternatively be a server of a distributed system, or a server combined with a blockchain.

In addition to the electronic device, any device herein can include a communication component and the like. The electronic device may be integrated with the communication component, or the electronic device and the communication component may be provided separately. The electronic device may acquire data (such as a picture and a video) from a sensing device (such as a camera), to perform image and video processing and data calculation. Alternatively, the electronic device itself, such as an AI camera, may alternatively have a sensing data acquisition function and a communication function, and the electronic device may directly perform image and video processing and data calculation based on acquired sensing data.

A cloud control platform performs processing in the cloud. The electronic device included in the cloud control platform may acquire data (such as a picture and a video) from a sensing device (such as a camera), to perform image and video processing and data calculation; and the cloud control platform may alternatively be called an edge computing platform, a cloud computing platform, a central system, a cloud server and the like.

It should be appreciated that the steps of reordering, adding or deleting may be executed using the various forms shown above. For example, the steps described in the present disclosure may be executed in parallel or sequentially or in a different order, so long as the expected results of the technical schemas provided in the present disclosure may be realized, and no limitation is imposed herein.

One or more elements or aspects or steps, or any portion(s) thereof, from one or more of any of claims 1-33 below can be combined with one or more elements or aspects or steps, or any portion(s) thereof, from one or more of any of the other claims 1-33 combinations thereof, to form one or more additional implementations and/or claims of the present disclosure.

While various examples of the present disclosure have been described above, it should be understood that they have been presented by way of example only, and not limitation. Numerous changes to the disclosed examples can be made in accordance with the disclosure herein without departing from the spirit or scope of the disclosure. Thus, the breadth and scope of the present disclosure should not be limited by any of the above described examples. Rather, the scope of the disclosure should be defined in accordance with the following claims and their equivalents.

Although the disclosure has been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this disclosure belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A system for providing a virtual bottle of a particular hard liquor within an establishment by use of an app on a smartphone, comprising:
    a refillable vat for containing a volume of specific hard liquor exceeding 1 liter, the refillable vat including a tap from which to pour the specific hard liquor;
    a host system associated with the establishment that communicates with smartphones of patrons within the establishment, wherein, in response to a first patron purchasing a virtual bottle of the specific hard liquor via the app on the smartphone, the host system provides the first patron with e-vouchers corresponding to a predetermined number of drinks of the specific hard liquor that is associated with the virtual bottle, the e-vouchers from the host system of the establishment are configured to be stored within the app on the smartphone;
    wherein, in response to the first patron ordering a drink containing the specific hard liquor via the app, the first patron redeems one of the e-vouchers and the drink is provided to the user after the specific hard liquor is poured from the tap of the refillable vat containing the specific hard liquor; and
    wherein the host system is coupled to a point-of-sale system within the establishment and, wherein in response to the first patron ordering the drink, the first patron provides, via the app on the smartphone, a code associated with the e-voucher to the point-of-sale system within the establishment, the code being readable at the point-of-sale system.

2. The system of claim 1, wherein, in response to the first patron transferring one of the e-vouchers to a second patron, the establishment host system permits the second patron to redeem the transferred e-voucher for a drink and decrements the number of e-vouchers associated with the first patron.

3. The system of claim 2, wherein the transferring of one of the e-vouchers to the second patron is accomplished through a communication link between the smartphone of the first and a smartphone of the second patron, the communication link being a WiFi link or a Bluetooth link.

4. The system of claim 1, wherein the e-vouchers provided to the first patron are configured to be displayed on a display of the smartphone of the first patron.

5. The system of claim 4, wherein a number of the e-vouchers correspond to the predetermined number of drinks from the establishment that are available to the first patron.

6. The system of claim 1, wherein, in response to the drink order from the virtual bottle by the first patron, the number of e-vouchers to the first patron is decremented and displayed on the display of the smartphone.

7. The system of claim 1, wherein the virtual bottle corresponds to a 750 ml bottle of the specific hard liquor and the predetermined number of drinks is sixteen.

8. The system of claim 1, wherein the e-vouchers are associated with at least one code that is configured to be displayed on the display of the smartphone, the code being a scannable image that can be read at the point-of-sale system.

9. The system of claim 8, wherein the at least one code is scannable by a scanner in communication with the host system.

10. The system of claim 1, further including a second refillable vat for containing a volume of a second specific hard liquor exceeding 1 liter, the second refillable vat including a second tap from which to pour the second specific hard liquor, and
    wherein in response to a second patron purchasing a second virtual bottle of the second specific hard liquor via the app on the smartphone of the second patron, the host system provides the second patron with a second set of e-vouchers corresponding to a predetermined number of drinks from the second virtual bottle, the second specific hard liquor being a different type of hard liquor than the specific hard liquor associated with the virtual bottle of the first patron.

11. The system of claim 1, wherein in response to a second patron purchasing a second virtual bottle of the specific hard liquor via the app on the smartphone of the second patron, the host system provides the second patron with a second set of e-vouchers corresponding to a predetermined number of drinks from the second virtual bottle associated with the second patron, the drinks associated with the first virtual bottle of the first patron and the second virtual bottle of the second patron both being poured from the refillable vat.

12. A computer-implemented method of receiving drink orders from a virtual bottle at an establishment, the method comprising:
    storing on a first computing device a virtual bottle representing a predetermined volume of virtual liquid corresponding to a first volume of a consumable hard liquor stored in a refillable vat structure at the establishment, the virtual bottle being divided into a plurality of e-vouchers, each of the plurality of e-vouchers corresponding to a consumable drink that includes the consumable hard liquor stored in the refillable vat structure;
    receiving, from a first user interface of a software application executed on a first computing device associated with the user, a request to deduct a to-be-dispensed portion of the virtual liquid from the virtual bottle;
    receiving, at a second computing device associated with the establishment, a first code associated with a first one of the plurality of e-vouchers provided by the first computing device, the first code representing a drink order that includes a portion of the consumable hard liquor stored in the refillable vat structure corresponding to the to-be-dispensed portion of the virtual liquid;
    validating the code at a point-of-sale (POS) system in the establishment and, responsive thereto, deducting the to-be-dispensed portion from the virtual bottle; and
    responsive to the validating, causing a drink including the portion of the consumable hard liquor stored in the refillable vat structure to be prepared in the establishment and poured into a tangible drinking vessel for delivery to the user of the first computing device in the establishment.

13. The method of claim 12, further comprising:
communicating directly or indirectly at least one of the plurality of e-vouchers from the first computing device to a third computing device associated with a second user of the establishment;
receiving from the third computing device a request to use the at least one of the plurality of e-vouchers;
receiving by the second computing device associated with the establishment, a second code provided by the third computing device, the second code being associated with the at least one of the plurality of e-vouchers and representing a second drink order redeemable by the at least one of the plurality of e-vouchers;
validating the second code at the point-of-sale (POS) system in the establishment, and, responsive thereto, removing or disabling the at least one e-voucher from the third computing device;
responsive to displaying the second drink order, causing a second drink fulfilling the second drink order to be prepared in the establishment and a corresponding portion of the consumable hard liquor stored in the refillable vat structure to be poured into a second tangible drinking vessel for delivery to the second user of the third computing device.

14. The method of claim 13, further comprising deducting from a memory of the first computing device a portion from the virtual bottle corresponding to a volume of consumable liquid associated with the at least one e-voucher.

15. The method of claim 12, wherein the deducting the to-be-dispensed portion from the virtual bottle further includes indicating that one of the plurality of e-vouchers has been redeemed.

16. The method of claim 15, wherein the redeemed e-voucher is associated with the validated first code.

17. The method of claim 12, wherein the refillable vat structure holds more than 1 liter of the consumable hard liquor, and the virtual bottle corresponds to a 750 ml bottle of the consumable hard liquor.

18. The method of claim 12, wherein the first computing device is a smartphone of the user and the second computing device is part of the host system for the establishment.

* * * * *

UNITED STATES PATENT AND TRADEMARK OFFICE
CERTIFICATE OF CORRECTION

PATENT NO. : 11,720,985 B2
APPLICATION NO. : 17/930032
DATED : August 8, 2023
INVENTOR(S) : Jeffry R. Smith et al.

It is certified that error appears in the above-identified patent and that said Letters Patent is hereby corrected as shown below:

In the Claims

At Column 13, Line 39 (Claim 1, Line 21), please delete "provided to the user" and insert --provided to the first patron-- therefor.

At Column 14, Line 52 (Claim 12, Line 14), please delete "executed on a first computing device" and insert --executed on the first computing device-- therefor.

Signed and Sealed this
Twelfth Day of September, 2023

*Katherine Kelly Vidal*

Katherine Kelly Vidal
*Director of the United States Patent and Trademark Office*